US009704003B1

(12) United States Patent
Anderson et al.

(10) Patent No.: US 9,704,003 B1
(45) Date of Patent: Jul. 11, 2017

(54) POSITION DETERMINATION AND CONTROL WITH RADIO FREQUENCY IDENTIFICATION TAGS (71) Applicant: Intel Corporation, Santa Clara, CA (US)

(72) Inventors: Glen J. Anderson, Beaverton, OR (US); Anand S. Konanur, Sunnyvale, CA (US); Kevin W. Bross, Tigard, OR (US); Gregory A. Peek, North Plains, OR (US); Rebecca A. Chierichetti, Brookings, OR (US); Ankur Agrawal, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/088,518

(22) Filed: Apr. 1, 2016

(51) Int. Cl.
G06K 7/10 (2006.01)
G01S 5/02 (2010.01)
A63F 9/24 (2006.01)
A63H 33/04 (2006.01)
A63H 33/08 (2006.01)
A63H 17/00 (2006.01)

(52) U.S. Cl.
CPC ............ *G06K 7/10366* (2013.01); *A63F 9/24* (2013.01); *A63H 17/002* (2013.01); *A63H 33/042* (2013.01); *A63H 33/08* (2013.01); *G01S 5/0252* (2013.01); *G06K 7/10297* (2013.01); *G06K 7/10316* (2013.01); *A63F 2009/247* (2013.01); *A63F 2009/2457* (2013.01); *A63F 2009/2479* (2013.01)

(58) Field of Classification Search
CPC ...... A63F 2009/2479; A63F 2009/2457; A63F 2009/247
See application file for complete search history.

(56) References Cited

U.S. PATENT DOCUMENTS

| 2012/0238366 A1* | 9/2012 | Tedder | A63H 30/04 463/42 |
| 2013/0123009 A1* | 5/2013 | Maharbiz | A63F 3/00643 463/31 |
| 2014/0113552 A1* | 4/2014 | Siddiqui | H04B 5/0056 455/41.1 |

* cited by examiner

*Primary Examiner* — Kristy A Haupt
(74) *Attorney, Agent, or Firm* — Schwabe, Williamson & Wyatt, P.C.

(57) ABSTRACT

Control of an apparatus is provided according to determination of positioning of information pieces with radio frequency identification (RFID) tags. In embodiments, an apparatus may include one or more pieces, wherein each piece may be positionable in one or more piece positions of a region and may include a passive RFID tag that stores information relating to a characteristic of the piece. An arrangement of RFID antennas may be positioned proximal to the region, and a RFID reader may provide reads of the pieces near the RFID antennas. One or more processors may determine the piece positions of the one or more pieces from the reads and may provide control of the apparatus according to the one or more pieces and their piece positions.

19 Claims, 7 Drawing Sheets

POSITION DETERMINATION AND CONTROL WITH RADIO FREQUENCY IDENTIFICATION TAGS

TECHNICAL FIELD

The present disclosure relates to the determination of locations of items within a region, which may relate to a toy or game. More particularly, the present disclosure relates to determining locations of items within a region with radio frequency identification tags and providing corresponding control of an apparatus.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Some toys, sometimes referred to as smart blocks, fit together with conductive connections between them to provide some activated response, which may include making sounds and/or activating lights, according to how the smart blocks are assembled. Such conductive connections can increase manufacturing costs and can reduce reliability.

DETAILED DESCRIPTION

Disclosed herein are apparatuses and methods associated with control of an apparatus according to determination of positioning of information pieces with radio frequency identification (RFID) tags. In embodiments, an apparatus may include one or more pieces, wherein each piece may be positionable in one or more piece positions of a region, and may include a passive RFID tag to store information relating to a characteristic of the piece. An arrangement of RFID antennas may be positioned proximal to the region, and a RFID reader may provide reads of the pieces near the RFID antennas.

In embodiments, a multiplexer may be provided to facilitate multiplexed reads of the pieces near the RFID antennas. One or more processors may determine the piece positions of the one or more pieces from the multiplexed reads and may provide apparatus control according to the one or more pieces and their piece positions. Such embodiments may provide reading or sensing of pieces at respective piece positions without conductive connections between the pieces and the piece positions and without electrical power being incorporated into or conductively applied to the pieces. Such embodiments may provide such apparatuses with increased reliability and decreased cost.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
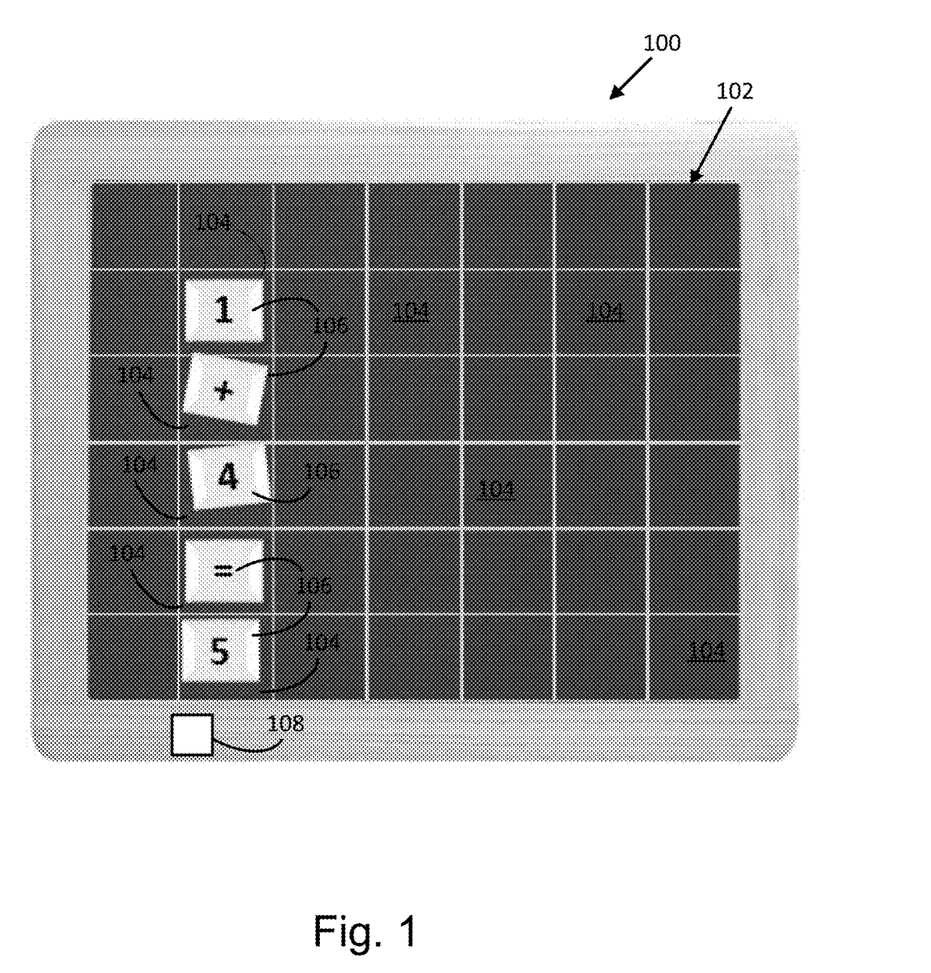
FIG. 1 is an illustration of an apparatus, which may include a board game or toy as illustrated, as an example of an operating environment of some embodiments.

FIG. 1 is an illustration of an apparatus 100, which may include a board game or toy as illustrated, as an example of an operating environment of some embodiments of the present disclosure. Apparatus 100 may include a region or surface 102 with multiple piece positions 104 where one or more pieces 106 (e.g., tiles) may be manually positioned. In embodiments, pieces 106 may have characteristics or information, such as printed alphanumeric, mathematical, or other symbols or graphics, which may be arranged to represent information such as a mathematical expression, as illustrated. It will be appreciated that other embodiments, whether educational or recreational, may include pieces and piece positions that convey or represent recreational and/or educational information relating to the game or toy. In embodiments, apparatus 100 may include an output 108, such as an optical display and/or an audio speaker. As will be described in more detail below with reference to the remaining figures, apparatus 100, including pieces 106, may be equipped with features of the present disclosure, such as radio frequency identification (RFID) tags and other components, to enable control of apparatus 100 according to the determination of the positions of pieces 106.

Figure 2:
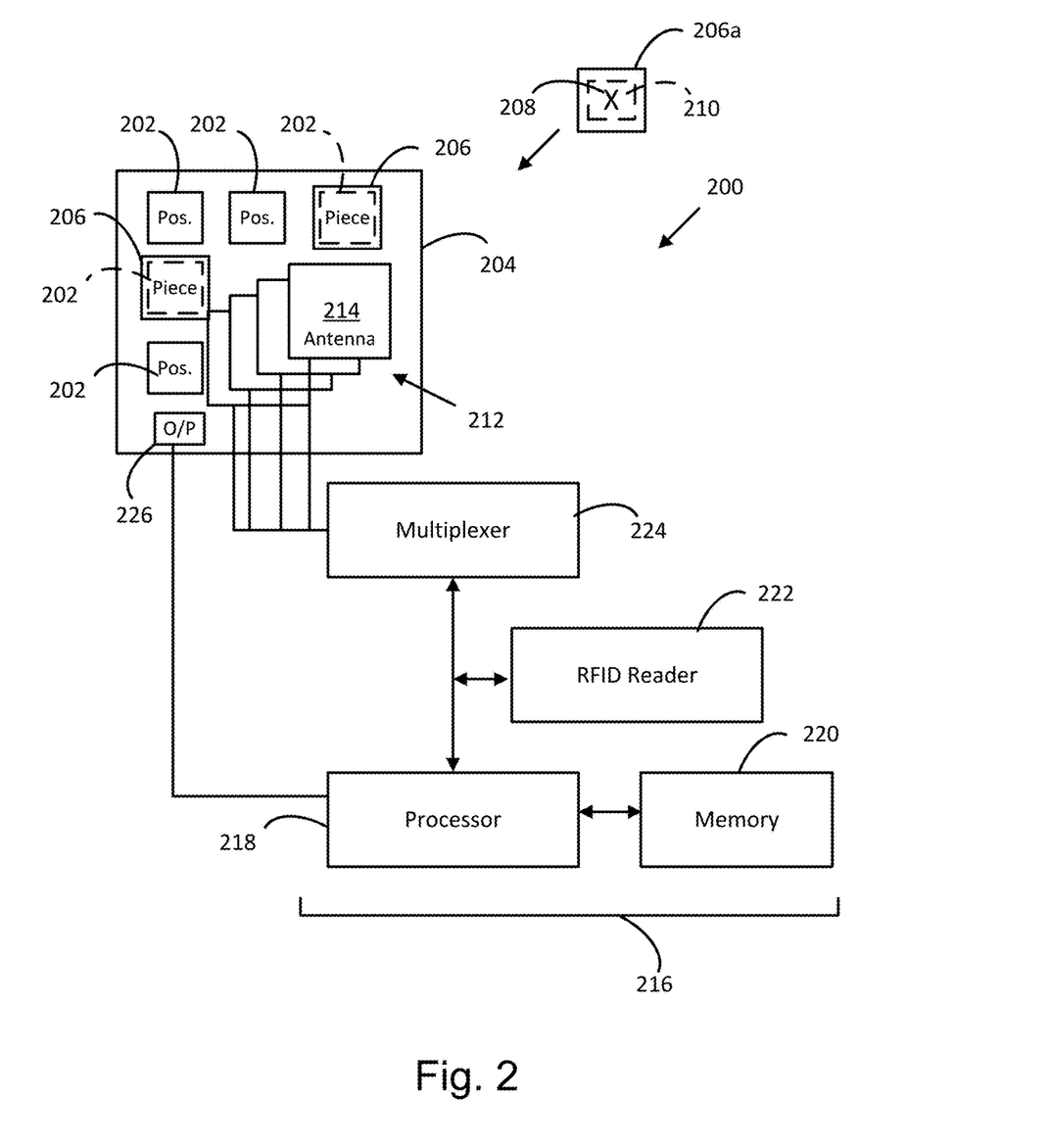
FIG. 2 is a block diagram of an apparatus to provide control based on determination of one or more positions on a region or surface where one or more pieces are located.

FIG. 2 is a block diagram 200 of an apparatus 200, which may be employed in connection with apparatus 100, for example, or another apparatus, toy, or game, to provide control of apparatus 200 based on determination of one or more positions 202 on a region or surface 204 where one or more pieces 206 are located. (Exemplary positions 202 and pieces 206 are shown.) In embodiments, the one or more pieces 206 may be placed manually at the one or more positions 202, such as pieces 106 in piece positions 104 of FIG. 1. Pieces 206 may each include a marking or other characteristic, such as an alphanumeric character or other symbol or indication, which may represent or convey information. With reference to an example piece 206a, which is shown to illustrate features of each of pieces 206, an example character or symbol 208 is indicated by the character "X."

With reference to example piece 206a, each piece 206 may include a radio frequency identification (RFID) tag 210 that may be embedded in or adhered or otherwise attached to the piece. The RFID tag 210 may include a passive RFID tag and, in embodiments, may include a passive near-field communication (NFC) tag. The RFID tag 210 may store information that corresponds to or provides access to information indicated by symbol 208.

Apparatus 200 may include an arrangement 212 of multiple RFID antennas 214 that may be positioned proximal to region or surface 204. Examples of arrangements of RFID antennas are described below in greater detail. A control system or module 216 may include a processor 218, such as a microcontroller or other processing unit, and a memory 220 that may store instructions to cause processor 218, in response to execution of the instructions by processor 218, to determine the positions 202 of one or more pieces 206 in region or on surface 204 and provide corresponding control of apparatus 200.

Processor 218 may control operation of an RFID reader 222 to activate RFID antennas 214 to read the RFID tags 210 of pieces 206 in region or on surface 204. For example, RFID reader 222 may initiate transmission of interrogation signals from the RFID antennas 214 and obtain responsive signals from the RFID tags 210. In embodiments, processor 218 may control operation of an RFID reader 222 and a multiplexer 224 to provide multiplexed or successive activation and reading of RFID tags 210 to determine the positions 202 of the one or more pieces 206 in region or on surface 204. For example, RFID antennas 214 and corresponding RFID tags 210 of pieces 206 may be read in a sequential order that corresponds to and indicates the positions 202 of the pieces 206. RFID tags 210 of pieces 206 may also be read in an order or sequence to prevent interference between tag reads. For example, apparatus 200 may avoid reading adjacent tags in succession, rather reading a non-adjacent tag after each read. Embodiments of RFID tags 210, RFID antennas 214, and RFID reader 222 may include near-field communication (NFC) tags, NFC antennas, and an NFC reader, respectively. In other embodiments, multiple RFID readers 222 may be employed, such as to provide reading of greater numbers of RFID antennas 214 and/or to provide reading of RFID antennas 214 at multiple different regions and/or surfaces 204. RFID antennas 214 may be laid out on a circuit board during manufacture to reduce costs in having individually manufactured and enclosed antennas.

Based upon the positions 202 of the one or more pieces 206, processor 218 may determine information represented by the pieces 206 and may control apparatus 200 by providing at an output 226 a response or other output relating to the information represented by the pieces 206 and their positions 202. In embodiments such as apparatus 100 (FIG. 1), for example, an output 108 (FIG. 1) may include an optical display and/or an audio speaker, and the response may indicate whether or not an expression represented by pieces 106 placed in a region 104 is correct. In other embodiments, the response may include an audio or visual rendering of an expression indicated by the pieces 206 and their positions 202, or may provide another physical or computerized manifestation or output.

Figure 3:
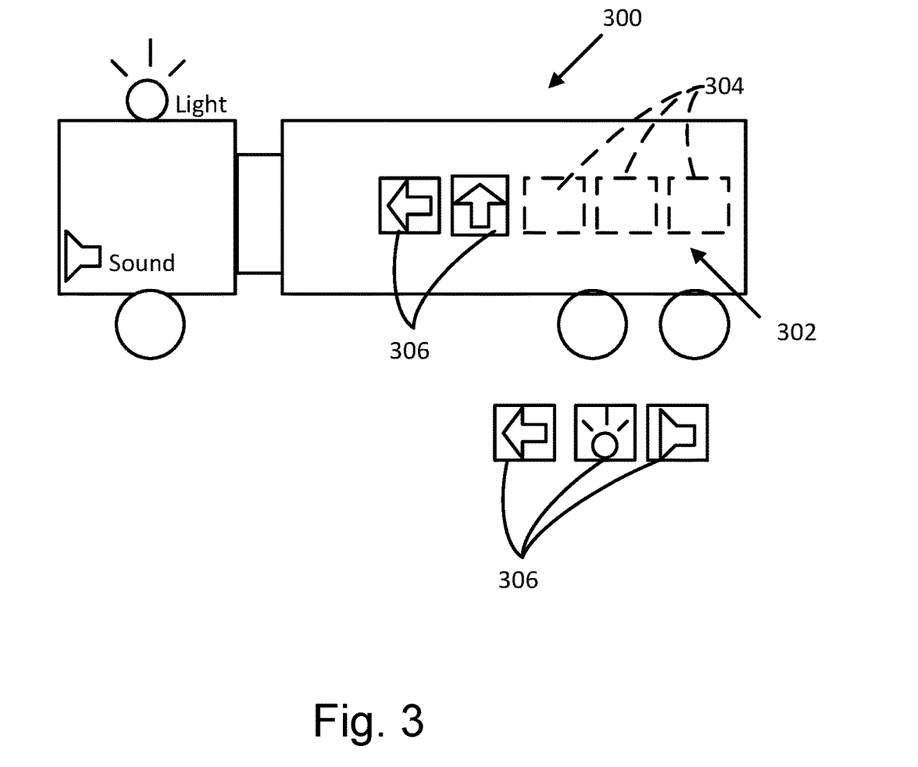
FIG. 3 is an illustration of an apparatus, which may include a robotic game or toy, as an example of another operating environment of some embodiments.

For example, FIG. 3 is an illustration of an apparatus 300, which may include a robot, such as a robotic game or toy vehicle (e.g., fire engine) as illustrated, as an example of another operating environment of some embodiments. Apparatus 300 may include a region or surface 302 with multiple piece positions 304 where one or more pieces 306 may be manually positioned. For example, piece positions 304 and pieces 306 may include complementary fittings or other structures by which pieces 306 may be held (e.g., "snapped") in place. In embodiments, pieces 306 may have graphical characteristics, such as robotic control instructions that may include straight motion, turn lotion, activate light, activate sound, etc., which may be arranged to represent a sequence of robotic instructions. In embodiments, apparatus 300 may include a control system or module such as control module 216, in which processor 218 may determine robotic control information represented by the pieces 306 and may provide as an output robotic operation of apparatus 300 relating to the information represented by the pieces 306 and their positions 302. Apparatus 300, illustrated as a recreational toy, may alternatively be implemented as an educational or utilitarian robot in which programming instructions may be implemented according to the piece positions 304 where one or more pieces 306 may be manually positioned.

Figure 4:
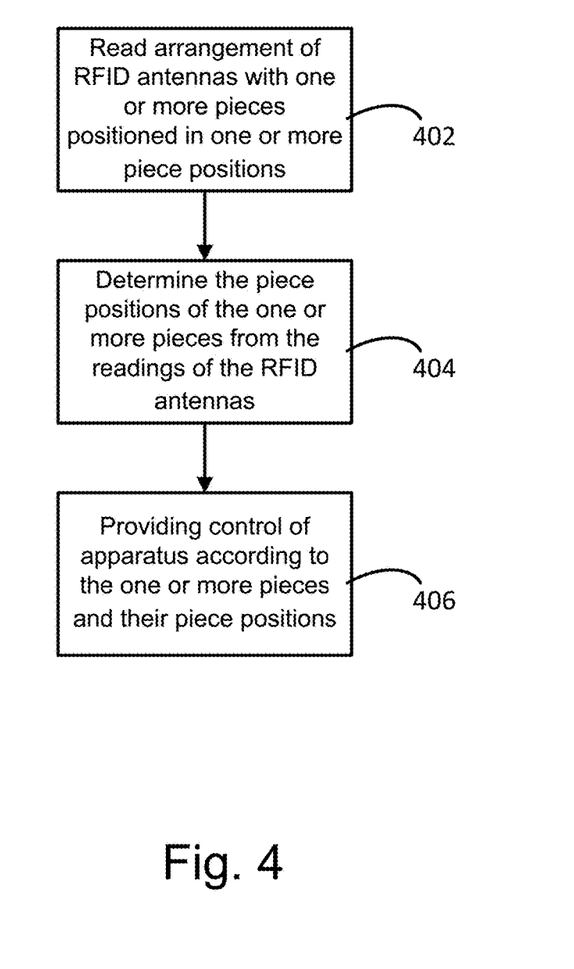
FIG. 4 illustrates a flow diagram for various apparatuses operating in accordance with various example embodiments.

FIG. 4 illustrates a flow diagram for various apparatuses operating in accordance with various example embodiments.

Operation 402 may include reading of an arrangement of RFID antennas positioned proximal to a region having one or more pieces positioned in one or more piece positions. In embodiments, the reading of the arrangement of plural RFID antennas may be multiplexed, and each piece may include a passive RFID tag, such as a passive NFC tag, that stores information relating to a characteristic of the piece.

Operation 404 may include determining the piece positions of the one or more pieces from the readings of the plural RFID antennas.

Operation 406 may include providing control of an apparatus according to the one or more pieces and their piece positions. In embodiments, control of an apparatus may include, for example, optical or audio information at an output 108 (FIG. 1) or robotic operation of apparatus 300 (FIG. 3). In other embodiments, control of an apparatus may include any other type of output or operation performed by an apparatus.

Figure 5:
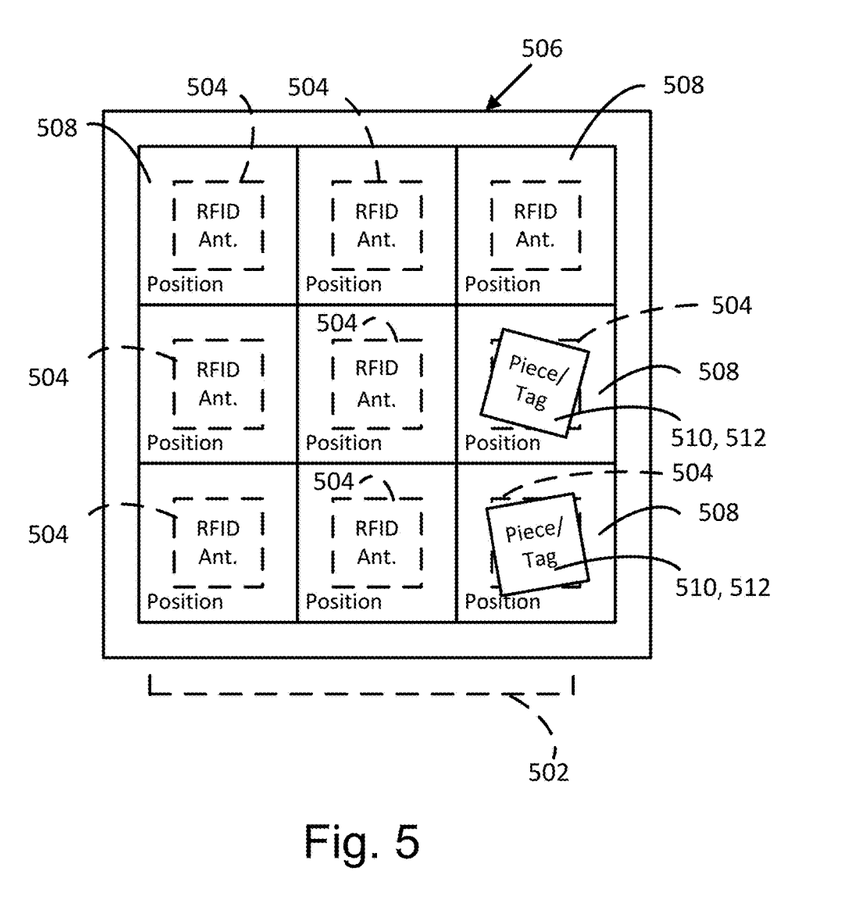
FIG. 5 is an illustration of an arrangement of RFID antennas positioned proximal to a region or surface with multiple piece positions where pieces with RFID tags may be manually positioned.

FIG. 5 is an illustration of an arrangement 502 of RFID antennas 504 (e.g., NFC antennas) positioned proximal to a region or surface 506 with multiple piece positions 508 where pieces 510 with RFID tags 512 may be manually positioned, as described above with reference to apparatus 200 (FIG. 2). In embodiments, one RFID antenna 504 may be positioned adjacent to or in alignment with each piece position 508. The location of a particular piece 510 positioned at a particular piece position 508 may be determined by the corresponding RFID antenna 504 reading the RFID tag 512 of the particular piece 510 at the particular piece position 508. The RFID antennas 504 of arrangement 502 may be read in a multiplexed manner, as described above.

Figure 6:
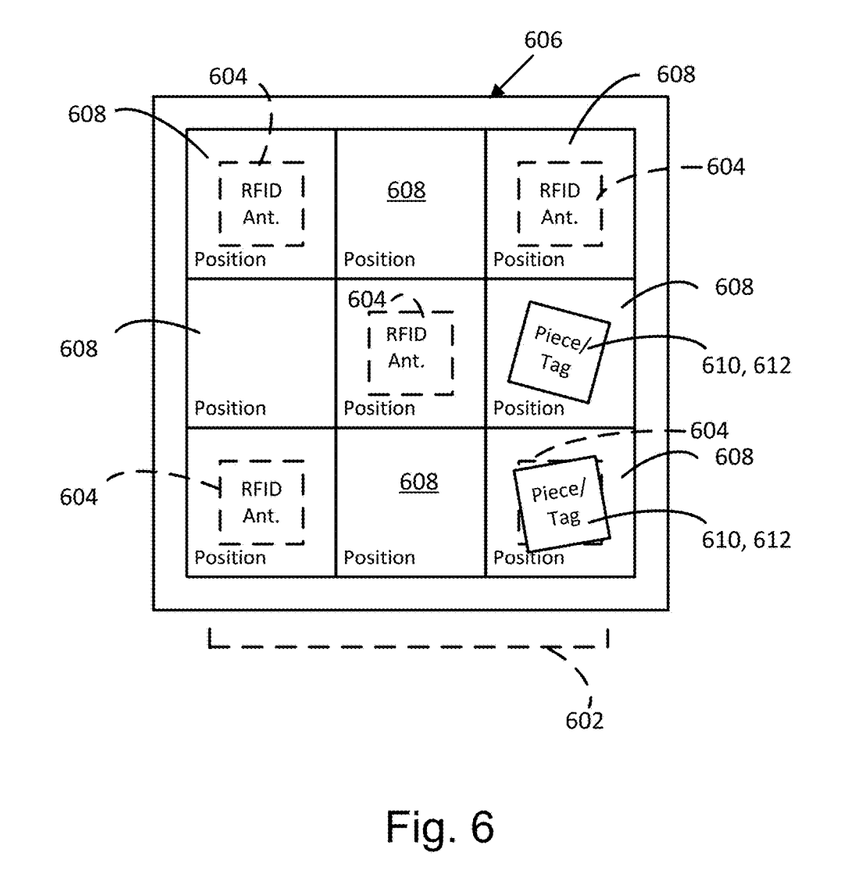
FIG. 6 is an illustration of another arrangement of RFID antennas positioned proximal to a region or surface with multiple piece positions where pieces with RFID tags may be manually positioned.

FIG. 6 is an illustration of an arrangement 602 of RFID antennas 604 (e.g., NFC antennas) positioned proximal to a region or surface 606 with multiple piece positions 608 where pieces 610 with RFID tags 612 may be manually positioned, as described above with reference to apparatus 200 (FIG. 2). Embodiments may include fewer RFID antennas 604 in arrangement 602 than the number of piece positions 608 on region or surface 606. The illustrated arrangement of RFID antennas 604 in arrangement 602 is merely exemplary. It will be appreciated that other arrangements of RFID antennas 604 may be used relative to piece positions 608. For example, arrangement 602 of RFID antennas 604 could be irregular relative to piece positions 608 to provide detection of pieces 610 at different areas of region or surface 606.

The location of a particular piece 610 and its RFID tag 612 at a particular piece position 608 may be determined by triangulating readings from more than one RFID antenna 604. For example, interrogation signals may be transmitted from the RFID antennas 604 in a sequence to obtain responsive signals from the RFID tags 612. In some circumstances, an RFID antenna 604 may receive responses from more than one RFID tag 612. In embodiments, the piece position 608 of a piece 610 and its RFID tag 612 may be resolved by a decision metric based on an aggregation of reads of the RFID tag 612 by more than one RFID antenna 604. In other embodiments, such reads may include controlling or limiting power of interrogation signals transmitted from the RFID antennas 604 to reduce the number of responding RFID tags 612.

In other embodiments, RFID tags 612 may provide indications of interrogation signal strength signal, such as by a Received Signal Strength Indication (RSSI), to facilitate triangulation. In still other embodiments, RFID tags 612 may include Hall Effect sensors and may provide relative field strength from fixed magnetic markers that may be positioned about region or surface 606, to facilitate triangulation. In some embodiments, such RFID tags 612 with Hall Effect sensors may provide determination of the location of a particular piece 610 independently of RFID reading. It will be appreciated that such embodiments of triangulation may also be employed to resolve locations of pieces and RFID tags in other arrangements of RFID antennas, such as arrangement 502 of RFID antennas 504 shown in FIG. 5. In still other embodiments, multiple RFID tags 612 may be embedded in each piece 610 in order to allow the determination of the orientation the piece 610 at surface 606. For example, orientation of a piece 610 with multiple RFID tags 612 may be determined according to which antenna 604 is proximal to and reads which of the multiple RFID tags 612.

Figure 7:
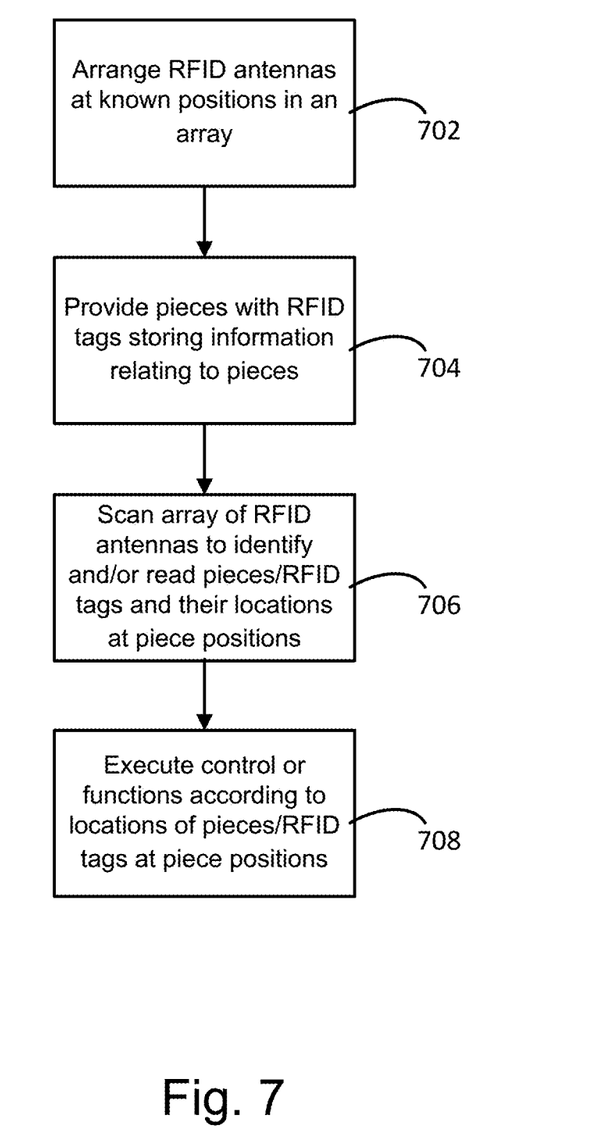
FIG. 7 illustrates a flow diagram for operations in accordance with various example embodiments.

FIG. 7 illustrates a flow diagram for operations of an apparatus in accordance with various example embodiments.

Operation 702 may include arranging RFID antennas at known positions in an array. In embodiments, arranging RFID antennas at known positions in an array may include positioning one RFID antenna adjacent to or in alignment with each piece position on a surface where the one or more pieces may be manually positioned. In other embodiments, arranging RFID antennas at known positions in an array may include positioning adjacent to or in alignment with the surface fewer RFID antennas than piece positions on the surface. In embodiments, the array may include a regular or an irregular arrangement of RFID antennas according to any arrangement of piece positions.

Operation 704 may include providing pieces with RFID tags that store information relating to the pieces. In embodiments, the pieces may each include a marking or other characteristic, such as an alphanumeric character or other symbol or indication, which may represent or convey information. Each piece may include an RFID tag that may be embedded in or adhered or otherwise attached to the piece and that may store information relating to a characteristic of the piece. For example, the information relating to a characteristic of the piece may relate a marking or other characteristic of the piece.

Operation 706 may include scanning of the array of RFID antennas to identify and/or read pieces/RFID tags and their locations at piece positions. In embodiments, scanning the array of RFID antennas may employ an RFID reader to activate the RFID antennas to read the RFID tags of the pieces at the piece positions on the surface. For example, the RFID reader may initiate transmission of interrogation signals from the RFID antennas and obtain responsive signals from the RFID tags of the pieces. In embodiments with one RFID antenna positioned adjacent to or in alignment with each piece position on a surface, the RFID antenna positioned adjacent to or in alignment with a selected piece position may identify and/or read the piece/RFID tag located at the selected piece position. In embodiments with fewer RFID antennas than piece positions on the surface, the piece/RFID tag located at a selected piece position may be identified and/or read by triangulating readings from one or more RFID antennas positioned adjacent to, in alignment with, or near the selected piece position.

Operation 708 may include providing control of or a function performed by the apparatus according to the locations of the pieces/RFID tags at piece positions. In embodiments, the control of or a function performed the apparatus may include, for example, providing optical or audio information at an output, robotic operation of the apparatus, any other type of output or operation that may be performed by the apparatus.

Thus various example embodiments of the present disclosure have been described including, but are not limited to:

Example 1 may include an apparatus, comprising: one or more pieces, each piece being positionable in one or more of plural piece positions of a region, and including a passive radio frequency identification (RFID) tag to store information relating to a characteristic of the piece; an arrangement of one or more RFID antennas to be positioned proximal to the region; a RFID reader; and one or more processors communicatively coupled with the RFID reader to determine the piece positions of the one or more pieces from reads of the one or more RFID antennas and to provide control of the apparatus according to the one or more pieces and their piece positions.

Example 2 may include the apparatus of example 1, or any other example herein, wherein a RFID antenna is positioned proximal to each piece position.

Example 3 may include the apparatus of example 1, or any other example herein, wherein the one or more RFID antennas include plural RFID antennas and the one or more processors further are to determine the piece position of at least one of the one or more pieces according to reads of more than one of the plural RFID antennas.

Example 4 may include the apparatus of example 3, or any other example herein, further comprising a multiplexer to couple the RFID reader to the one or more processors to provide multiplexed reads of the plural RFID antennas, wherein the multiplexed reads of the plural RFID antennas include multiplexed transmission of interrogation signals from the plural RFID antennas, each RFID tag is to provide indications of signal strength of one or more of the interrogation signals received by the RFID tag, and the one or more processors are to determine the piece position of at least one of the pieces according to the indications of signal strength of the one or more of the interrogation signals received by the RFID tag of the at least one of the pieces.

Example 5 may include the apparatus of example 1, or any other example herein, wherein the region includes a toy surface and the one or more pieces include toy pieces.

Example 6 may include the apparatus of example 5, or any other example herein, wherein the one or more toy pieces and their piece positions correspond to an expression of information and the apparatus control includes output as to whether the expression of information is correct.

Example 7 may include the apparatus of example 6, or any other example herein, wherein the expression of information includes a mathematical expression.

Example 8 may include the apparatus of example 5, or any other example herein, wherein the one or more toy pieces and their piece positions correspond to a sequence of actions to be performed by a toy.

Example 9 may include the apparatus of example 8, or any other example herein, wherein the sequence of actions to be performed by the toy includes robotic operation of the toy.

Example 10 may include the apparatus of example 1, or any other example herein, wherein each RFID tag includes a near field communication (NFC) tag, each RFID antenna includes a NFC antenna, and the RFID reader includes a NFC reader.

Example 11 may include the apparatus of example 1, or any other example herein, wherein at least one piece includes plural RFID tags.

Example 12 may include a method, comprising: multiplexed reading, by one or more processors, an arrangement of plural RFID antennas positioned proximal to a region having plural piece positions and one or more pieces positioned in one or more of the plural piece positions, each piece including a passive radio frequency identification (RFID) tag that stores information relating to a characteristic of the piece; determining, by the one or more processors, the piece positions of the one or more pieces from the multiplexed readings of the plural RFID antennas; and providing, by the one or more processors, an output according to the one or more pieces and their piece positions.

Example 13 may include the method of example 12, or any other example herein, wherein determining the piece positions of each of the one or more pieces includes determining the piece position of each the one or more pieces with a multiplexed reading of a corresponding one of the plural RFID antennas.

Example 14 may include the method of example 12, or any other example herein, wherein determining the piece positions of the one or more pieces includes determining the piece positions of the one or more pieces with multiplexed reading more than one of the plural RFID antennas.

Example 15 may include the method of example 14, or any other example herein, wherein reading comprises multiplexed reading, and wherein the multiplexed reading of the arrangement of plural RFID antennas includes providing multiplexed transmission of interrogation signals from the plural RFID antennas and obtaining from the RFID tag of each piece an indication of signal strength of the interrogation signal, and determining the piece positions of the one or more pieces with multiplexed reading more than one of the plural RFID antennas includes applying the indications of signal strength of the interrogation signals from the more than one of the plural RFID antennas.

Example 16 may include the method of example 12, or any other example herein, wherein the region includes a toy surface and the one or more pieces include toy pieces.

Example 17 may include the method of example 16, or any other example herein, wherein the one or more toy pieces and their piece positions correspond to an expression of information and the output includes an indication whether the expression of information is correct.

Example 18 may include the method of example 17, or any other example herein, wherein the expression of information includes a mathematical expression.

Example 19 may include the method of example 16, or any other example herein, wherein the one or more toy pieces and their piece positions correspond to a sequence of actions to be performed by a toy.

Example 20 may include the method of example 19, or any other example herein, wherein the output includes control of a robotic operation of the toy.

Example 21 may include the method of example 12, or any other example herein, wherein the multiplexed reading of an arrangement of plural RFID antennas includes near field communication (NFC).

Example 22 may include at least one computer-readable medium including instructions to cause a computing device, in response to execution of the instructions by the computing device, to: obtain reads of an arrangement of plural RFID antennas positioned proximal to a region having plural piece positions and one or more pieces positioned in one or more of the plural piece positions, each piece including a passive radio frequency identification (RFID) tag that stores information relating to a characteristic of the piece; determine the piece positions of the one or more pieces from the reads of the plural RFID antennas; and provide an output according to the one or more pieces and their piece positions.

Example 23 may include the at least one computer-readable medium of example 22, or any other example herein, wherein the instructions cause the computing device, in response to execution of the instructions by the computing device, to read the arrangement of plural RFID antennas in a multiplexed manner.

Example 24 may include the at least one computer-readable medium of example 22, or any other example herein, wherein the instructions cause the computing device, in response to execution of the instructions by the computing device, to: provide transmission of interrogation signals from the plural RFID antennas and to obtain from the RFID tag of each piece an indication of signal strength of the interrogation signal; and determine the piece positions of the one or more pieces based at least in part on the indications of signal strength of the interrogation signals.

Example 25 may include the at least one computer-readable medium of example 22, or any other example herein, wherein the instructions cause the computing device, in response to execution of the instructions by the computing device, to determine the piece positions of each of the pieces from the read of a corresponding one of the plural RFID antennas.

Example 26 may include the at least one computer-readable medium of example 22, or any other example herein, wherein the instructions cause the computing device, in response to execution of the instructions by the computing device, to determine the piece positions of each of the pieces from the reads of more than one of the plural RFID antennas.

Example 27 may include the at least one computer-readable medium of example 22, or any other example herein, wherein the output includes a display according to the one or more pieces and their piece position.

Example 28 may include the at least one computer-readable medium of example 22, or any other example herein, wherein the output includes control of a robotic operation.

Example 29 may include an apparatus, comprising: means to obtain reads of an arrangement of plural RFID antennas to be positioned proximal to a region having plural piece positions and one or more pieces positioned in one or more of the plural piece positions, each piece including a passive radio frequency identification (RFID) tag that stores information relating to a characteristic of the piece; means to determine the piece positions of the one or more pieces from the reads of the plural RFID antennas; and means to provide control of an apparatus according to the one or more pieces and their piece positions.

Example 30 may include the apparatus of example 29, or any other example herein, wherein the means to obtain reads of the arrangement of plural RFID antennas includes means to obtain multiplexed reads of the arrangement of plural RFID antennas.

Example 31 may include the apparatus of example 29, or any other example herein, wherein: the means to obtain reads of the arrangement of plural RFID antennas includes means to provide transmission of interrogation signals from the plural RFID antennas and to obtain from the RFID tag of each piece an indication of signal strength of the interrogation signal; and the means to determine the piece positions of the one or more pieces from the reads of the plural RFID antennas includes means to determine the piece positions of the one or more pieces based at least in part on the indications of signal strength of the interrogation signals.

Example 32 may include the apparatus of example 29, or any other example herein, wherein the means to determine the piece positions of the one or more pieces from the reads of the plural RFID antennas includes means to determine the piece positions of each of the pieces from the read of a corresponding one of the plural RFID antennas.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus, comprising:
   one or more pieces, each piece being positionable in one or more of plural piece positions of a region, and including a passive radio frequency identification (RFID) tag to store information relating to a characteristic of the piece;
   an arrangement of one or more RFID antennas to be positioned proximal to the region;
   a RFID reader; and
   one or more processors coupled with the RFID reader to determine the piece positions of the one or more pieces from reads of the one or more RFID antennas and to provide control of the apparatus according to the one or more pieces and their piece positions,
   wherein the one or more RFID antennas include plural RFID antennas and the one or more processors further are to determine the piece position of at least one of the one or more pieces according to reads of more than one of the plural RFID antennas, and
   the apparatus further comprises a multiplexer to couple the RFID reader to the one or more processors to provide multiplexed reads of the plural RFID antennas, wherein the multiplexed reads of the plural RFID antennas include multiplexed transmission of interrogation signals from the plural RFID antennas, each RFID tag is to provide indications of signal strength of one or more of the interrogation signals received by the RFID tag, and the one or more processors are to determine the piece position of at least one of the pieces according to the indications of signal strength of the one or more of the interrogation signals received by the RFID tag of the at least one of the pieces.

2. The apparatus of claim 1, wherein a RFID antenna is positioned proximal to each piece position.

3. The apparatus of claim 1, wherein the region includes a toy surface and the one or more pieces include toy pieces.

4. The apparatus of claim 3, wherein the one or more toy pieces and their piece positions correspond to an expression of information and the apparatus control includes output as to whether the expression of information is correct.

5. The apparatus of claim 4, wherein the expression of information includes a mathematical expression.

6. The apparatus of claim 3, wherein the one or more toy pieces and their piece positions correspond to a sequence of actions to be performed by a toy.

7. The apparatus of claim 1, wherein each RFID tag includes a near field communication (NFC) tag, each RFID antenna includes a NFC antenna, and the RFID reader includes a NFC reader.

8. The apparatus of claim 1, wherein at least one piece includes plural RFID tags.

9. A method, comprising:
   multiplexed reading, by one or more processors, an arrangement of plural RFID antennas positioned proximal to a region having plural piece positions and one or more pieces positioned in one or more of the plural piece positions, each piece including a passive radio frequency identification (RFID) tag that stores information relating to a characteristic of the piece;
   determining, by the one or more processors, the piece positions of the one or more pieces from a multiplexed reading of more than one of the plural RFID antennas; and
   providing, by the one or more processors, an output according to the one or more pieces and their piece positions,
   wherein the multiplexed reading of the arrangement of plural RFID antennas includes providing multiplexed transmission of interrogation signals from the plural RFID antennas and obtaining from the RFID tag of each piece an indication of signal strength of the interrogation signals, and wherein determining the piece positions of the one or more pieces with multiplexed reading of more than one of the plural RFID antennas includes applying the indications of signal strength of the interrogation signals from the more than one of the plural RFID antennas.

10. The method of claim 9, wherein determining the piece positions of each of the one or more pieces includes determining the piece position of each of the one or more pieces with a multiplexed reading of a corresponding one of the plural RFID antennas.

11. The method of claim 9, wherein the region includes a toy surface and the one or more pieces include toy pieces.

12. The method of claim 9, wherein the multiplexed reading of an arrangement of plural RFID antennas includes near field communication (NFC).

13. At least one non-transitory computer-readable medium including instructions to cause a computing device, in response to execution of the instructions by the computing device, to:
obtain reads of an arrangement of plural RFID antennas positioned proximal to a region having plural piece positions and one or more pieces positioned in one or more of the plural piece positions, each piece including a passive radio frequency identification (RFID) tag that stores information relating to a characteristic of the piece;
provide transmission of interrogation signals from the plural RFID antennas and obtain from the RFID tap of each piece an indication of signal strength of the interrogation signals;
determine the piece positions of the one or more pieces from the reads of the plural RFID antennas and the indications of signal strength of the interrogation signals;
provide an output according to the one or more pieces and their piece positions.

14. The at least one non-transitory computer-readable medium of claim 13, wherein the instructions cause the computing device, in response to execution of the instructions by the computing device, to read the arrangement of plural RFID antennas in a multiplexed manner.

15. The at least one non-transitory computer-readable medium of claim 13, wherein the instructions cause the computing device, in response to execution of the instructions by the computing device, to determine the piece positions of each of the pieces from the read of a corresponding one of the plural RFID antennas.

16. The at least one non-transitory computer-readable medium of claim 13, wherein the instructions cause the computing device, in response to execution of the instructions by the computing device, to determine the piece positions of each of the pieces from the reads of more than one of the plural RFID antennas.

17. The at least one non-transitory computer-readable medium of claim 13, wherein the output includes control of a robotic operation.

18. An apparatus, comprising:
means to obtain reads of an arrangement of plural RFID antennas to be positioned proximal to a region having plural piece positions and one or more pieces positioned in one or more of the plural piece positions, each piece including a passive radio frequency identification (RFID) tag that stores information relating to a characteristic of the piece, wherein the means to obtain reads of the arrangement of plural RFID antennas includes means to provide transmission of interrogation signals from the plural RFID antennas and to obtain from the RFID tag of each piece indications of signal strength of the interrogation signals;
means to determine the piece positions of the one or more pieces from the reads of the plural RFID antennas, wherein the means to determine the piece positions of the one or more pieces from the reads of the plural RFID antennas includes means to determine the piece positions of the one or more pieces based at least in part on the indications of signal strength of the interrogation signals; and
means to provide control of an apparatus according to the one or more pieces and their piece positions.

19. The apparatus of claim 18, wherein the means to obtain reads of the arrangement of plural RFID antennas includes means to obtain multiplexed reads of the arrangement of plural RFID antennas.

* * * * *